United States Patent [19]

Yoshinaga et al.

[11] E Patent Number: Re. 32,462

[45] Reissued Date of Patent: Jul. 21, 1987

[54] CENTRIFUGAL FLUID MACHINE

[75] Inventors: Yoichi Yoshinaga, Minorimachi; Shinjiro Ueda, Kashiwa; Hideo Nishida, Shimoinayoshi, all of Japan

[73] Assignee: Hitachi, Ltd., Tokyo, Japan

[21] Appl. No.: 759,440

[22] Filed: Jul. 26, 1985

Related U.S. Patent Documents

Reissue of:

[64] Patent No.: 4,395,197
Issued: Jul. 26, 1983
Appl. No.: 171,268
Filed: Jul. 22, 1980

[30] Foreign Application Priority Data

Aug. 1, 1979 [JP] Japan ..... 54-97273

[51] Int. Cl.[4] ..... F04D 29/44; F04D 29/68

[52] U.S. Cl. ..... 415/211; 415/DIG. 1

[58] Field of Search ..... 415/181, 211, DIG. 1, 415/219 B, 210, 209

[56] References Cited

U.S. PATENT DOCUMENTS

| | | | |
|---|---|---|---|
| 1,047,663 | 12/1912 | Lawaczeck | 415/219 A X |
| 2,384,251 | 9/1945 | Hill | 415/211 X |
| 2,844,001 | 7/1958 | Alford | 415/DIG. 1 X |

FOREIGN PATENT DOCUMENTS

| | | | |
|---|---|---|---|
| 36-6326 | 5/1961 | Japan . | |
| 152689 | 10/1920 | United Kingdom | 415/211 |
| 419639 | 2/1974 | U.S.S.R. | 415/211 |
| 572586 | 9/1977 | U.S.S.R. | 415/211 |

*Primary Examiner*—Robert E. Garrett
*Assistant Examiner*—Joseph M. Pitko
*Attorney, Agent, or Firm*—Antonelli, Terry & Wands

[57] ABSTRACT

A centrifugal compressor includes an impeller and a diffuser arranged around the outer periphery of the impeller and including a pair of annular, spaced diffuser plates defining a diffuser channel therebetween. A plurality of guide vanes are provided on at least one of the pair of diffuser plates to guide a low flow angle portion of a fluid flow introduced into the diffuser channel from the outlet of the impeller. The guide vanes each extend from the inlet of the diffuser channel to a position which does not exceed about one half the distance between the inlet and the outlet of the diffuser channel and have a height which is less than one half the spacing between the pair of diffuser plates.

11 Claims, 6 Drawing Figures

CENTRIFUGAL FLUID MACHINE

Matter enclosed in heavy brackets [ ] appears in the original patent but forms no part of this reissue specification; matter printed in italics indicates the additions made by reissue.

BACKGROUND OF THE INVENTION

This invention relates to centrifugal fluid machines, and more particularly it is concerned with a diffuser of a centrifugal fluid machine, such as centrifugal compressor, centrifugal pump, etc., and has an object to achieve a wide operation range and an increased efficiency.

DESCRIPTION OF THE PRIOR ART

Figure 1:
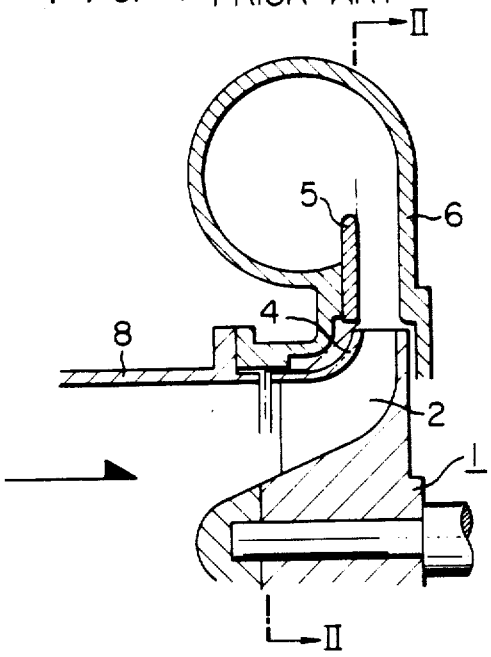
FIG. 1 PRIOR ART
FIG. 1 is a vertical sectional view of a centrifugal fluid machine (compressor) of the prior art.
Figure 2:
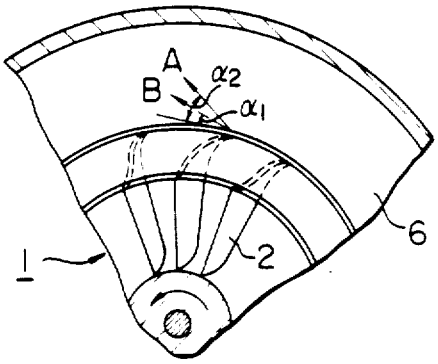
FIG. 2 PRIOR ART
FIG. 2 is a sectional view taken along the line II—II in FIG. 1.
Figure 3:
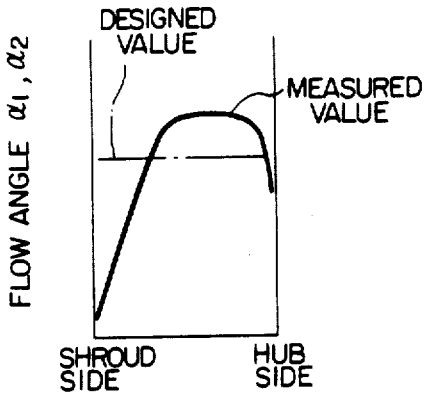
FIG. 3 is a diagram showing the distribution, across the width of the fluid channel, of the flow angles at the outlet of the impeller.

A centrifugal fluid machine will be described by referring to a centrifugal compressor as an example. A centrifugal compressor functions to compress gas by means of a rotating impeller and convert the kinetic energy of the gas into pressure energy by means of a diffuser arranged around the outer periphery of the impeller. FIG. 1 shows a centrifugal compressor of the prior art in which a fluid is drawn into an impeller 1 from an intake port through a suction duct 8. In the impeller 1, boundary layers would develop on surfaces of fluid channels and the fluid would be influenced by the Coriolis force and curvature in the fluid channels, so that fluid of low momentum would be collected on suction surfaces (trailing surfaces as seen in the direction of rotation) of blades 2 in the circumferential direction of the impeller 1 and on the side of a shroud 4 in the widthwise of the blades 2. As a result, it has been found that a flow distortion (non-uniformity) occurs at the outlet of the impeller 1 as shown in FIGS. 2 and 3. More specifically, experiments have shown that the angle formed by a fluid flow indicated by an arrow B near the wall surface with respect to the circumferential direction or a flow angle $\alpha_1$ is smaller than the angle formed by a fluid flow indicated by an arrow A in the center of a fluid channel with respect to the circumferential direction or a flow angle $\alpha_2$. FIG. 3 shows the distribution of flow angles as seen widthwise of the blades 2. It will be seen that the flow angle tends to become smaller on the side of the shroud 4, particularly in an impeller of high specific speed designed to handle a large volume of fluid. In impellers having this flow pattern at the outlet of the impeller, it is commonly observed that rotation of the impeller 1 produces a predominantly large circumferential velocity component and that the absolute velocity is substantially at the same level through the entire width of the outlet of the impeller.

The non-uniformity of flow of fluid at the outlet of the impeller 1 or the inlet of a diffuser channel defined by a pair of spaced diffuser plates 5 and 6 would adversely affect the performance of the diffuser. In particular, a flow of fluid of small flow angle near the wall surface would cause separation of flow or friction losses to be produced and reduce the flow flow rate side performance of a vaneless diffuser, thereby narrowing the range of operation of a fluid machine (compressor) provided with a vaneless diffuser. Also, when the non-uniformity of flow is of a large degree, a vaneless diffuser would have a low pressure recovery rate, so that operation efficiency would be reduced.

In order to avoid the phenomenon described hereinabove, proposals have hitherto been made to provide ribs or guide vanes on the wall surfaces of the diffuser plates defining a fluid channel as is disclosed in Japanese Patent Publication No. 6326/1961, Japanese Utility Model Publication No. 28119/1971 (Utility Model Registration No. 961072) and Japanese Patent Laid-Open No. 119411/1978. However, none of these devices have been able to obviate the aforesaid problem encountered in diffusers of the prior art.

SUMMARY OF THE INVENTION

This invention has as its object the provision of a centrifugal fluid machine capable of obviating the aforesaid disadvantages of centrifugal fluid machines of the prior art.

The centrifugal fluid machine according to the invention is characterized by comprising a plurality of guide vanes provided on at least one of a pair of annular spaced diffuser plates of a diffuser, each of the plurality of guide vanes extending from the inlet of a diffuser channel defined between the diffuser plates to a position which does not exceed about one half the distance between said inlet of the diffuser channel and the outlet thereof, and each guide vane having a height less than one half the spacing between the pair of spaced diffuser plates.

The guide vanes provided by the invention are intended to forcedly bring the distorted fluid flow at the outlet of the impeller or at the inlet of the diffuser channel to a substantially uniform flow condition, to thereby improve the performance of the vaneless diffuser.

The invention has been developed based on the observations that the main fluid flow is greatly distorted immediately after it is released from the impeller, and that the flow angle thereof is widely distributed widthwise of the impeller. The plurality of guide vanes provided by the invention are characterized by being disposed close to the outlet of the impeller and having a considerably large height, i.e., a height corresponding to ½–1/5 the spacing between the pair of diffuser plates. Stated differently, the guide vanes are disposed in a region of small flow angle in a portion of the diffuser channel contiguous to the outlet of the impeller which occupies about ½–1/5 the spacing between the pair of diffuser plates as actually measured, and each guide vane has a height substantially equal to the value of the small flow angle region.

DESCRIPTION OF THE PREFERRED EMBODIMENTS

Figure 4:
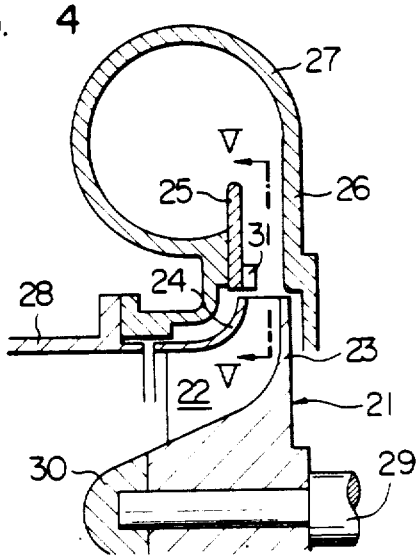
FIG. 4 is a vertical sectional view of the diffuser of the centrifugal fluid machine comprising one embodiment of the invention.

One embodiment of the invention will be described by referring to FIGS. 4 and 5. FIG. 4 is a vertical section view of a first embodiment of the centrifugal fluid machine (compressor) in conformity with the invention wherein an impeller 21 comprises a plurality of blades 22, a hub 23 and a shroud 24. The impeller 21 is secured to a rotary shaft 29 by a nut 30. Mounted radially outwardly of the impeller 21 is a vaneless diffuser comprising a pair of annular, spaced diffuser plates 25 and 26 defining therebetween a diffuser channel. A casing 27 is disposed outwardly of the vaneless diffuser. A suction duct 28 is provided for drawing a fluid by suction into an intake port of the impeller 21.

In the centrifugal fluid machine shown in FIG. 4, a plurality of guide vanes 31 (only one is shown) are provided on the surface of the diffuser plate 25 disposed on the same side as the shroud 24 and project into the diffuser channel defined between the diffuser plates 25 and 26 in such a manner that the guide vanes 31 are located only in a region of the diffuser channel of small flow angle at the inlet thereof. As shown in FIG. 5, the guide vanes 31 each have an inlet angle $\beta_3$ which is smaller than the designed mean flow angle shown in FIG. 3 and an outlet angle $\beta_4$ which is substantially equal to the designed mean flow angle. The guide vanes 31 each have a length such that each vane extends over the radially inward half portion of the area between the opposite ends of the diffuser channel or over an area substantially $\frac{1}{2}$–$\frac{1}{4}$ the distance between the inlet and outlet of the diffuser channel from the inlet thereof, so that the fluid machine can show a good performance by virtue of the features of the vaneless diffuser. The guide vanes 31 each have a height which is $\frac{1}{2}$–1/5 the width of the diffuser channel, i.e., the spacing between the pair of diffuser plates 25 and 26.

As is clear from the foregoing description, the invention enables the distorted main flow of fluid at the outlet of the impeller 21 to be forcedly brought to a substantially uniform flow condition in a region extending from the inlet of the diffuser channel to midway between the opposite ends of the diffuser channel, by virtue of the guide vanes arranged in the radially inward half portion of the diffuser channel. Thus in the centrifugal fluid machine according to the invention, it is possible to avoid the phenomenon of unstable operation of the vaneless diffuser due to separation of fluid flow from the wall surface of the diffuser or reversing of flow, thereby greatly improving the low flow rate side performance. Since a uniform flow of fluid is obtained downstream of the guide vanes, the performance of the vaneless diffuser can be improved to thereby improve the performance of the centrifugal fluid machine.

Figure 5:
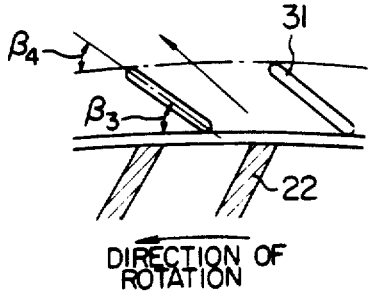
FIG. 5 is a sectional view, as seen in the direction of arrows V—V of the diffuser shown in FIG. 4.
Figure 6:
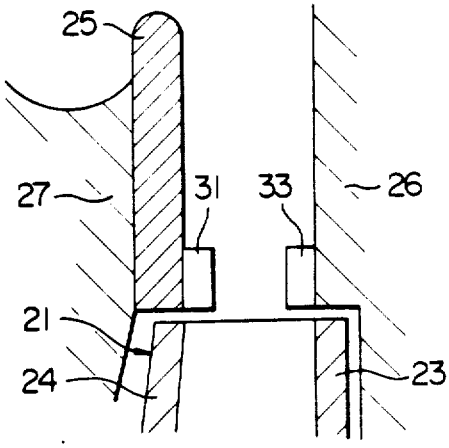
FIG. 6 is a vertical sectional view of another embodiment of the invention.

FIG. 6 shows a second embodiment in which a plurality of guide vanes 33 similar to the guide vanes 31 shown in FIGS. 4 and 5 are provided (only one is shown) on the diffuser plate 26 on the same side as the hub 23 in a manner to project into the diffuser channel. The guide vanes 33 cooperate with the guide vanes 31 on the diffuser plate 25 on the same side as the shroud 24 to perform the function of guiding a flow of fluid of a low flow angle portion on the side of the hub 23 to bring the distorted flow to a substantially uniform flow condition. The low flow angle region on the side of the hub 23 is usually small so that the guide vanes 33 may have a height less than the height of the guide vanes 31 on the side of the shroud 24.

It has hitherto been considered undesirable to provide guide vanes on a portion of the diffuser channel which is close to the outlet of the impeller because of alleged production of noise by this structural arrangement. However, experiments have shown that the guide vanes according to the invention is devoid of this adverse side effect, due probably to the fact that the guide vanes according to the invention do not extend through the entire width of the diffuser channel. It has been ascertained that the structural arrangement of the guide vanes according to the invention can achieve excellent effects in obtaining a uniform fluid flow in the diffuser channel.

What is claimed is:

1. A centrifugal fluid machine comprising:

an impeller having an outlet;

a diffuser having performance characteristics of the vaneless diffuser type located around the outlet of said impeller and including a pair of opposed, but spaced annular diffuser plates having respective inner surfaces which define a diffuser channel therebetween, said diffuser channel having an inlet continuous to the outlet of said impeller and an outlet radially remote therefrom; and a plurality of guide vane means, provided in a circular array on at least one of said inner surfaces of said pair of diffuser plates in a manner extending from a position within the inlet of said diffuser channel contiguous with the outlet of the impeller toward the outlet of said diffuser channel to a position which does not exceed about one-half the distance between said inlet and outlet of the diffuser channel in a region of a low flow angle portion of fluid flow introduced into the diffuser channel from the impeller outlet by said impeller, for guiding only said low flow angle portion of the fluid flow from the outlet of the impeller, said guide vane means each having a height, corresponding substantially to that of the low flow angle flow region, $\frac{1}{2}$ to 1/5 the spacing between said pair of diffuser plates.

2. A centrifugal fluid machine as claimed in claim 1, wherein said impeller includes a shroud, a hub and a plurality of blades extending between said shroud and said hub, wherein said pair of diffuser plates are respectively disposed with one on the side of the shroud and one on the side of the hub, and wherein said guide vanes means are provided on the one of said pair of diffuser plates which is disposed on the side of said shroud.

3. A centrifugal fluid machine as claimed in claim 1, wherein said guide vanes are provided on each of said pair of diffuser plates.

4. A centrifugal fluid machine as claimed in claim 1 or 2 or 3, wherein said guide vane means comprise guide vanes which each have a uniform height along its entire length.

*5. A centrifugal fluid machine comprising:*

*an impeller having a shroud, a hub and a plurality of blades extending between said shroud and said hub, said shroud and said hub having their respective adjacent radially outer edges cooperating with each other to define therebetween an outlet;*

*a vaneless diffuser located around the outlet of said impeller and including a pair of opposed, but spaced first and second annular diffuser plates respectively located adjacent to said shroud and said hub, said first and second diffuser plates having respective inner surfaces which cooperate with each other to define therebetween a diffuser channel, said diffuser channel having an inlet continuous to the outlet of said impeller and an outlet radially remote therefrom, and*

*a plurality of guide vanes, provided in a circular array on the inner surface of at least one of said first and sec-*

*ond diffuser plates, for rectifying distorted flow from the outlet of said impeller, said guide vanes extending in said diffuser channel from close to the outlet of the impeller toward the outlet of said diffuser channel, said guide vanes extending from the inner surface of said at least one diffuser plate toward the other diffuser plate to a location substantially equal to the value of the small flow angles widthwise of the inlet of said diffuser channel.*

*6. A centrifugal fluid machine as defined in claim 5, wherein said location to which said guide vanes extend from the inner surface of said at least one diffuser plate toward the other diffuser plate is positioned within a range from ½ to 1/5 the width of said diffuser channel.*

*7. A centrifugal fluid machine as defined in claim 5, wherein said guide vanes extend from the inner surface of said first diffuser plate toward said second diffuser plate.*

*8. A centrifugal fluid machine as defined in claim 5, wherein said guide vanes extend from the inner surface of said second diffuser plate toward said first diffuser plate.*

*9. A centrifugal fluid machine as defined in claim 5, wherein said guide vanes extend from the inner surface of each of said diffuser plates.*

*10. A centrifugal fluid machine as defined in claim 5, wherein said location of the guide vanes substantially corresponds to a point at which one of actual values of flow angle widthwise of the inlet of said diffuser channel is coincident with a value of a mean flow angle of said actual values at the side of said at least one diffuser plate.*

*11. A centrifugal fluid machine as defined in claim 5, wherein said guide vanes extend in said diffuser channel from a location coincident with the inlet of said diffuser channel.*

* * * * *